United States Patent [19]

Nakaki et al.

[11] Patent Number: 4,656,232
[45] Date of Patent: Apr. 7, 1987

[54] METHOD FOR PRODUCTION OF POLYMER

[75] Inventors: Masashi Nakaki, Ibaraki; Katsumi Terawaki, Himeji; Tadao Shimomura, Toyonaka; Kazumasa Kimura, Osaka, all of Japan

[73] Assignee: Nippon Shokubai Kagaku Kogyo Co. Ltd., Osaka, Japan

[21] Appl. No.: 799,025

[22] Filed: Nov. 18, 1985

[30] Foreign Application Priority Data

Nov. 21, 1984 [JP] Japan .................................. 59-244545

[51] Int. Cl.$^4$ .............................................. C08F 2/16
[52] U.S. Cl. .................................................. 526/88
[58] Field of Search ........................................ 526/88

[56] References Cited

U.S. PATENT DOCUMENTS 4,098,977 7/1978 Zweigle ................................. 526/88

Primary Examiner—Paul R. Michl
Attorney, Agent, or Firm—Omri M. Behr

[57] ABSTRACT

A method for the production of a polymer from an aqueous solution of a corresponding $\alpha$, $\beta$-ethylenically unsaturated monomer, which method is characterized by forwarding said aqueous monomer solution and an inert gas each in the form of a continuous flow toward the site of polymerization, spouting either of said two fluids through a nozzle parallelly into the flow of the other fluid thereby creating forced contact between said aqueous monomer solution and said inert gas and effecting substantial removal of dissolved oxygen from said aqueous monomer solution before said aqueous monomer solution reaches the site of polymerization.

7 Claims, 2 Drawing Figures

METHOD FOR PRODUCTION OF POLYMER

BACKGROUND OF THE INVENTION

1. Field of the Invention

This invention relates to a method for the production of a polymer. More particularly, this invention relates to a method for the production of a polymer from an aqueous solution of a corresponding $\alpha, \beta$-ethylenically unsaturated monomer.

2. Description of Prior Art

Heretofore, polymers obtained by polymerizing aqueous solutions of such $\alpha, \beta$-ethlenically unsaturated monomers as acrylic acid salts, methacrylic acid salts, and acrylamides have found extensive utility as thickener, flocculants, dispersants, water absorbents, etc.

The aqueous solution of an $\alpha, \beta$-ethylenically unsaturated monomer is inhibited from being smoothly polymerized by dissolved oxygen. When the solution is prepared for polymerization, therefore, it is necessary that the dissolved oxygen be removed from the solution in advance of the polymerization. The idea of effecting the removal of dissolved oxygen in each polymerization vessel or in each cycle of polymerization cannot be called very wise from the technological point of view. Where the polymerization involves use of a plurality of polymerization vessels or where it is carried out in the form of a continuous operation, the practice of effecting the removal of dissolved oxygen collectively on the aqueous monomer solution compounded at once in a large volume and subjecting the aqueous monomer solution now free from the dissolved oxygen to polymerization proves more rational. Unfortunately, the aqueous monomer solution so deprived of dissolved oxygen is liable to be polymerized by light or impurities. Particularly when the aqueous monomer solution is prepared in a highly concentrated form or when the aqueous monomer solution happens to contain a crosslinking monomer, once polymerization starts on the aqueous monomer solution, the system loses fluidity so much as to render desired removal of heat of polymerization difficult. Thus, there is a possibility that the aqueous monomer solution will suddenly undergo polymerization in the container used for holding the solution or in the pipe used for transferring the solution from the container to the polymerization vessel. In this respect, the aqueous monomer solution compounded at once in a large volume and gradually putting the aqueous monomer solution freed from the dissolved oxygen to polymerization does not prove desirable. If the polymerization does not suddenly occur, it has a possibility of entailing occurrence of an insoluble gel. This gel, when left to take its own course, may gradually grow and eventually clog the pipe leading into the polymerization vessel and jeopardize the plant's operation. When the polymerization is carried out batchwise in a plurality of polymerization vessels or when it is carried out continuously in one polymerization vessel, the practice of effecting the removal of dissolved oxygen continuously and quickly and allowing the aqueous monomer solution freed from the dissolved oxygen to be fed continuously to the polymerization vessel proves particularly desirable. The desirability of perfecting a method capable of continuously removing dissolved oxygen from the aqueous monomer solution has come to find growing recognition.

As one approach to the solution, there has been proposed a method which effects instantaneous deoxidation of an aqueous monomer solution while the aqueous monomer solution is being transferred through a pipe to a polymerization vessel by forwarding an inert gas into contact with the aqueous monomer solution through a diffusing tube or a diffusing panel provided with fine perforations therein (Japanese Patent Publication No. SHO 54(1979)-37,910). In the operation of this method, after protracted use of the diffusing tube or diffusing panel, the insoluble polymer gradually adheres thereto and eventually clogs the fine perforations formed therein and, as the result, the flow of the inert gas encounters growing resistance and the supply of the inert gas no longer proceeds smoothly. If the gel deposit is left growing, it will come off the diffusing tube or diffusing panel and clog the pipe, or even give adverse effects on the quality of the produced polymer. Thus, the apparatus used for working the method can hardly endure protracted use.

An object of this invention, therefore, is to provide a novel method for the production of a polymer.

Another object of this invention is to provide a method for attaining stable production of a polymer from an aqueous solution of a corresponding monomer by very rapidly and continuously removing dissolved oxygen from the aqueous monomer solution and enabling the aqueous monomer solution freed from the dissolved oxygen to be uniformly supplied to the site of polymerization in spite of protracted use of an apparatus used for working the method.

SUMMARY OF THE INVENTION

The objects described above are accomplished by a method for the production of a polymer from an aqueous solution of a corresponding $\alpha, \beta$-ethylenically unsaturated monomer, which method is characterized by forwarding the aqueous monomer solution and an inert gas each in the form of a continuous flow toward the site of polymerization, spouting either of the two flows of fluid through a nozzle parallelly into the other flow thereby creating forced contact between the aqueous monomer solution and the inert gas and effecting substantial removal of dissolved oxygen from the aqueous monomer solution before the aqueous monomer solution reaches the site of polymerization.

EXPLANATION OF PREFERRED EMBODIMENT

Figure 1:
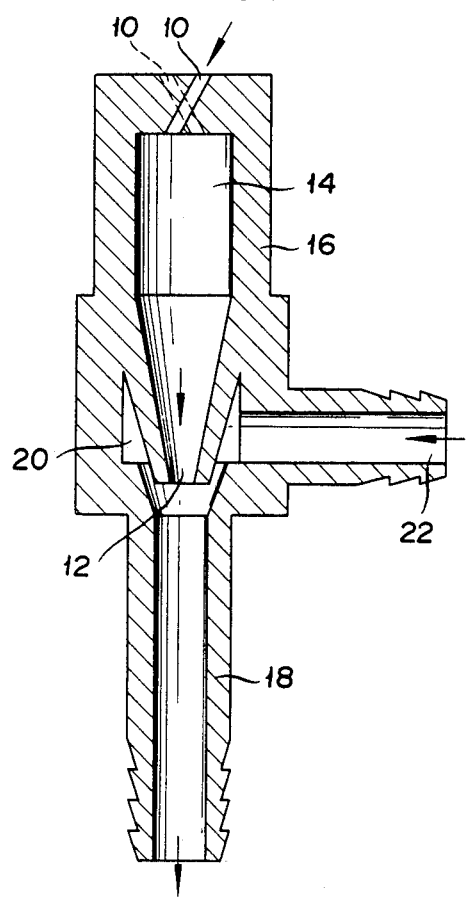
FIG. 1 is a cross section illustrating a typical aspirator to be used in working the method of this invention.

Typical examples of the monomer usable advantageously in this invention include acrylic acid and methacrylic acid and alkali metal salts and ammonium salts thereof, acrylamide, methacrylamide, acrylonitrile, methacrylonitrile, 2-hydroxyethyl (meth)acrylate, 2-hydroxypropyl (meth)acrylate, 3-hydroxypropyl (meth)acrylate, methyl (meth)acrylate, ethyl (meth)acrylate, isopropyl (meth)acrylate, butyl (meth)acrylate, methyl methacrylate, ethyl methacrylate, isopropyl methacrylate, and maleic acid. One monomer or a mixture of two or more monomers selected from the group of monomers enumerated above can be used advantageously for the production of the polymer by the method of this invention.

Where the polymer to be produced is desired to be a cross-linked polymer, the monomer mentioned above may be used in combination with a cross-linking monomer. Examples of the cross-linking monomer usable effectively herein include diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylol propane, and pentaerythritol, triacrylates and trimethacrylates of trimethylol propane and pentaerythritol, tetraacrylate and tetramethacrylate of pentaerythritol, N,N'-methylene-bis-acrylamide, N,N'-methylene-bis-methacrylamide, and triallyl isocyanurate. One monomer or a mixture of two or more monomers selected from the group of monomers enumerated above can be used. Generally, the cross-linking monomer is used in an amount not exceeding 10 mol %, desirably in the range of 0.0005 to 5 mol %, and more desirably in the range of 0.001 to 1 mol %, based on the water-soluble monomer.

In all the monomers enumerated above, it is particularly desirable for the purpose of this invention to use a monomer mixture which comprises (A) at least one monomer selected from the group consisting of acrylic acid and methacrylic acid, and alkali metal salts and ammonium salts thereof, acrylamide and methacrylamide and (B) a cross-linking monomer possessing at least two polymeric double bonds within the molecular unit thereof and which contains the cross-linking monomer of (B) in a proportion of not more than 10 mol %. As the cross-linking monomer of (B), at least one member selected from the group of cross-linking monomers enumerated above can be used. If in this case, the amount of the cross-linking monomer of (B) exceeds 10 mol % based on the monomer of (A), the produced polymer is deficient in water-absorbing property and ion-exchange capacity. The proportion of the cross-linking monomer of (B) is desired to fall in the range of 0.0005 to 5 mol %, preferably 0.001 to 1 mol %. The concentration of the monomer mixture in the aqueous monomer solution is desired to fall in the range of 10 to 80% by weight, preferably 20 to 60% by weight.

The inert gas to be used for forced contact with the aqueous monomer solution and consequent removal of dissolved oxygen therefrom is a gas chemically inactive on the α, β-ethylenically unsaturated monomer and incapable of inhibiting the monomer from polymerization. Examples of the inert gas include nitrogen gas, carbon dioxide gas, argon, methane, and ethane.

For the removal of dissolved oxygen, into either of the flow of the aqueous monomer solution and that of the inert gas both forwarded toward the site of polymerization (hereinafter referred to as the "first fluid"), the other fluid (hereinafter referred to as the "second fluid") is spouted through a nozzle. In this case, the second flow is spouted parallelly into the flow of the first fluid. If the two fluids run oppositely to each other there ensues a highly undesirable possibility that the two fluids will be heavily splashed against the wall of the pipe and the monomer so deposited thereon will be polymerized in situ. As means of effecting the parallel spouting mentioned above and consequently creating required contact between the aqueous monomer solution and the inert gas, it is desirable to use an aspirator or an ejector.

The aspirator generally is a device for spouting the second fluid through a nozzle and discharging the first fluid by virture of suction generated by a suction chamber. A typical construction of the aspirator is illustrated in FIG. 1. A nozzle proper 16 is provided at one end thereof with a second fluid inlet 10, at the other end thereof with a nozzle 12, and in the interior thereof with a second fluid passage chamber 14. A suction chamber 20 is formed so as to encircle the nozzle 12. This suction chamber 20 communicates with a first fluid feed inlet 22 as well as with a diffuser part 18. Particularly in the illustrated construction, for the purpose of imparting rotational motion to the second fluid, the second fluid inlet is composed of a plurality of orifices of varying inclination. The aspirator is not required to be limited to this particular design but may be in a suitably varied design.

Figure 2:
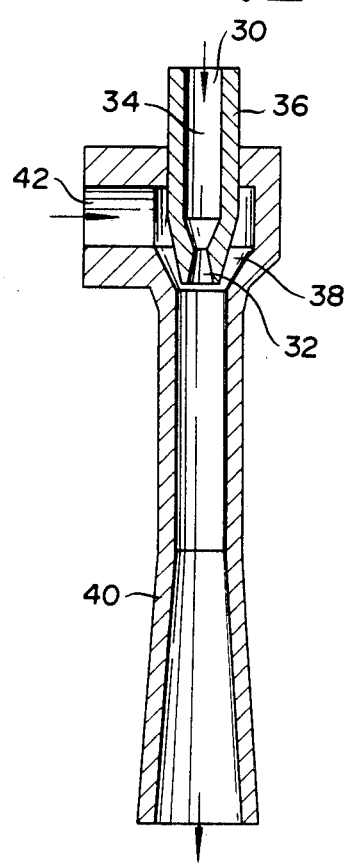
FIG. 2 is a cross section illustrating a typical ejector to be used in working the method of this invention.

The ejector is not different in operating principle from the aspirator, except that the nozzle thereof generally has a diverging orifice. A typical construction of the ejector is illustrated in FIG. 2. A nozzle proper 36 is provided at one end thereof with a second fluid inlet 30, at the other end thereof with a nozzle 32 with a diverging orifice, and in the interior thereof with a second fluid passage chamber 34. A suction chamber 38 is formed so as to encircle the nozzle 36. This suction chamber 38 associates with a first fluid feed inlet 42 as well as with a diffuser part 40. The ejector is not always required to be limited to this particular design.

The required contact between the aqueous monomer solution and the inert gas is attained by the use of any of the apparatuses described above. The fluid to be spouted through the nozzle is either the aqueous monomer solution or the inert gas. The choice between these two fluids not critical to this invention.

The amount of the inert gas to be fed based on the amount of the aqueous monomer solution to be fed is variable with the tolerable concentration of dissolved oxygen in the aqueous monomer solution to be fed to the site of polymerization. The tolerable concentration of dissolved oxygen in the aqueous monomer solution is also variable with the conditions of polymerization, the degree of polymerization aimed at, etc. Generally, however, the ratio of the amount of the inert gas to be fed relative to that of the aqueous monomer solution to be fed is desired to fall in the range of 0.1 to 10, preferably 1 to 7, by volume. If the ratio of the amount of the inert gas to that of the aqueous monomer solution to be fed is less than 0.1, sufficient removal of dissolved oxygen cannot be obtained. If this ratio exceeds 10, the operation proves uneconomical as a whole.

The spouting speed of the second fluid cannot be generally fixed because of possible variation in the tolerable concentration of dissolved oxygen in the aqueous monomer solution fed to the site of polymerization, the construction and dimensions of the nozzle, etc. For the purpose of enabling the second fluid spouted through the nozzle parallelly into the flow of the first fluid to create contact between the two fluids preferably in a state of vigorous turbulence and bring about effective removal of dissolved oxygen, the spouting speed is desired to be such that the Reynolds number of the second fluid at the narrowest point of the orifice in the nozzle is at least 1,000. Desirably, the Reynolds number is not less that 2,000, preferably in the range of 2,000 to $10^7$. If the Reynolds number of the second fluid at the narrowest point of the nozzle is less than 1,000, the contact between the two fluids is not enough to attain thorough removal of dissolved oxygen. An effort to obtain desired removal of dissolved oxygen at such a lower Reynolds number as described above entails an inevitable increase in the amount of the inert gas to be fed relative to the amount of the aqueous monomer solution with a sacrifice of the economy of the production.

Optionally, the contact time between the aqueous monomer solution and the inert gas may be elongated to enhance the efficiency of removal of dissolved oxygen as by attaching a straight tube of proper length to the outlet of the aspirator or increasing the length of the diffuser part of the ejector. If the contact time is excessively elongated, there ensue the possibility that the reaction will cause an undesired polymerization. Thus, the retention time is desired to be restrained within the limit of 20 seconds.

The aqueous monomer solution from which the dissolved oxygen has been removed as described above is admixed with a polymerization initiator and then subjected to polymerization in an atmosphere of inert gas. The polymerization can be performed batchwise or continuously. The reaction temperature and the reaction time are variable with the kind of the monomer being used. Generally, the polymerization is carried out at a temperature in the range of 0° to 99° C., preferably 10° to 95° C. Where polymerization can be performed batchwise, the reaction time falls in the range of 0.1 to 24 hours, preferably 0.5 to 10 hours. Naturally, the polymerization initiator to be used herein is required to be soluble in water. Examples of the polymerization initiator usable advantageously for the polymerization are persulfates such as ammonium persulfate and potassium persulfate, hydrogen peroxide, and water-soluble azo compounds such as 2,2'-azobis(2-amidinopropane) diacetate and 2,2'-azobis(2-amidinopropane) dihydrochloride.

Optionally, this polymerization initiator may be used in combination with a sulfite, a hydrogensulfite, a thiosulfate, L-ascorbic acid, or a ferric salt so as to serve as a redox initiator. The amount of the radical polymerization initiator is in the range of 0.0005 to 10% by weight, preferably 0.001 to 5% by weight.

Now, the present invention will be described more specifically below with reference to working examples. It should be noted that these examples are purely illustrative, and not limitative in any respect, of the present invention. Wherever parts and percents (%) are mentioned in the examples, they are invariably meant as parts and percents by weight.

EXAMPLE 1

In an aspirator (the inside diameter at the narrowest point of the nozzle at the leading end thereof 5 mm) constructed as illustrated in FIG. 1, an aqueous 36% sodium acrylate solution was fed at a flow rate of 6 liters/minute through the second fluid inlet 10 and nitrogen gas was fed at a flow rate of 24 liters/minute through the first fluid feed inlet 22 to effect removal of dissolved oxygen from the aqueous monomer solution. During this treatment, the Reynolds number at the narrowest point of the nozzle 12 at the leading end thereof was about 4,000.

A port for introduction of a polymerization initiator was disposed of about 10 cm from the outlet of the diffuser 18 to feed an aqueous 1% ammonium persulfate solution at a proportion of 1,500 ppm relative to the weight of the aqueous monomer solution. The aqueous monomer solution so prepared was led into a polymerization vessel displaced in advance with nitrogen gas and left polymerizing therein at a temperature of 30°–80° C. for 6 hours. The polymer in the form of gel taken out of the polymerization vessel after the polymerization was homogeneous product of high quality. After this operation for the removal of dissolved oxygen was continued for 24 hours, deposition of any water-insoluble polymer was found nowhere in the aspirator.

The removal of dissolved oxygen was carried out by following the procedure described above, except that the addition of the polymerization initiator was omitted. In the aqueous sodium acrylate solution resulting from the treatment, the concentration of dissolved oxygen was 0.1 ppm as compared with 7 ppm, the concentration in the same aqueous monomer solution before the treatment. After the removal of oxygen was continued for 24 hours, the concentration of the dissolved oxygen was still 0.1 ppm

EXAMPLE 2

In an ejector (the inside diameter of the nozzle at the narrowest point thereof 4 mm) constructed as illustrated in FIG. 2, nitrogen gas was fed at a flow rate of 17 liters/minute through the second fluid inlet 30 and an aqueous 36% sodium acrylate solution was fed at a flow rate of 6 liters/minute through the first fluid feed inlet 42 to effect removal of dissolved oxygen from the aqueous monomer solution. The concentration of dissolved oxygen in the aqueous sodium acrylate solution was 7 ppm before the removal of dissolved oxygen and 0.5 ppm after the removal. The Reynolds number at the narrowest point of the nozzle was about 6,000.

After this operation for the removal of dissolved oxygen was continued for 24 hours, deposition of any water-insoluble polymer was found nowhere in the ejector. Further, after the removal of the dissolved oxygen was continued for 24 hours, the concentration of the dissolved oxygen in the aqueous sodium acrylate solution was 0.5 ppm and it was unchanged compared to the concentration when the removal started. The monomer mixture freed from dissolved oxygen as described above was led into a polymerization vessel left polymerizing therein at a temperature of 30° to 80° C. for 6 hours. The polymer in the form of gel taken out of the polymerization vessel after the polymerization was a homogeneous product of high quality.

CONTROL 1

An aqueous 36% sodium acrylate solution (dissolved oxygen concentration of 7 ppm) was fed at a flow rate of 5 liters/minute downwardly into a vertically suspended plastic pipe 50 mm in inside diameter and 1,000 mm in length and nitrogen gas was fed at a flow rate of 15 liters/minute into the same pipe through a bowl-shaped filter provided with fine diffusing pores of an average diameter of 10 $\mu$m and disposed at the lower end of the pipe to create counterflow contact between the aqueous sodium acrylate solution and the nitrogen gas. The aqueous sodium acrylate solution which had undergone removal of dissolved oxygen was withdrawn from the lower end of the pipe. In the aqueous sodium acrylate solution so obtained through the lower end of the pipe was found to have a dissolved oxygen concentration of 0.8 ppm.

After this operation for the removal of dissolved oxygen was continued for 24 hours, not only heavy deposition of water-insoluble gel was found on the bowl-shaped filter, but also the concentration of dissolved oxygen in the aqueous sodium acrylate solution obtained from the lower end of the pipe increased to 1.1 ppm. Deposition of a polymer was recognized at the upper end of the pipe.

EXAMPLE 3

In an aspirator (the inside diameter at the narrowest point of the nozzle at the leading end thereof 2 mm) constructed as illustrated in FIG. 1, an aqueous monomer solution consisting of 40 parts of partially neutralized acrylic acid having 75% thereof neutralized with sodium hydroxide, 0.014 part of N,N'-methylene-bis-acrylamide, and 60 parts of water was fed at a flow rate of 1.5 liters/minute through the second fluid inlet 10 and nitrogen gas was fed at a flow rate of 7 liters/minute through the first fluid feed inlet 22 to effect removal of dissolved oxygen from the aqueous monomer solution. This treatment lowered the dissolved oxygen concentration of the aqueous monomer solution from 8 ppm to 0.1 ppm. A port for introducing a polymerization initiator was disposed at a distance of about 10 cm from the outlet of the nozzle. Through this port, an aqueous 1% 2,2'-azobis(2-amidinopropane) dihydrochloride solution was fed as a polymerization initiator at a proportion of 2.3% based on the aqueous monomer solution.

The aqueous monomer solution which has undergone removal of dissolved oxygen and had been admixed with the polymerization initiator was fed to a continuous polymerization vessel formed by attaching a nitrogen inlet tube and an aqueous monomer solution inlet tube to a jacketed three-axis kneader having an inner volume of 200 liters and provided with two Banbery type stirring vanes and one discharging screw. In this continuous polymerization vessel, the aqueous monomer solution was left polymerizing at a temperature of 80° to 90° C. under an atmosphere of nitrogen gas. The water-containing polymer in the form of gel consequently produced was continuously pulverized by the three-axis kneader and discharged by the discharging screw.

After this continuous polymerization was contiuned for 24 hours, deposition of any undesirable polymer was found nowhere in the aspirator. The hydrated polymer in the form of gel so produced was useful as an absorbent for water.

CONTROL 2

Similar to Control 1, an aqueous monomer solution having the same composition as Example 3 was fed at the same flow rate as Example 3 into a vertically suspended plastic pipe 4 mm in inside diameter and 1,000 mm in length and nitrogen gas was fed into the same pipe through a bowl-shaped filter provided with fine diffusing pores of an average diameter of 10 $\mu$m and disposed at the lower end of the pipe to create counterflow contact between the aqueous sodium acrylate solution and the nitrogen gas. The aqueous sodium acrylate solution which had undergone removal of dissolved oxygen was withdrawn from the lower end of the pipe. In the aqueous sodium acrylate solution so obtained through the lower end of the pipe was found that a dissolved oxygen concentration decreased to 0.5 ppm from 8 ppm.

The aqueous monomer solution obtained from the lower end of the pipe was mixed with 1% aqueous solution of 2,2'-azobis(2-amidinopropane) hydrochloride as polymerization initiator in an initiator mixing vessel, and after discharged from the initiator mixing vessel, it was fed into the same three-axis kneader used in Example 3 and was subjected to polymerization by a similar method to Example 3. Fed amount of 1% aqueous 2,2'-azobis(2-amidinopropane) hydrochloride solution is 2.3% per the aqueous monomer solution. The hydrated polymer in the form of gel consequently produced was continuously pulverized by the three-axis kneader and discharged by the discharging screw.

After this operation for the removal of dissolved oxygen was continued for 6 hours, no only heavy deposition of water-insoluble gel was found on the bowl-shaped filter, but also the polymer was produced on the upper end of the pipe. The concentration of dissolved oxygen increased to 0.9 ppm, but further continuous polymerization was carried out because the polymerization could be continued.

After 9 hours from starting polymerization, a water-insoluble gel was clogged in a pipe connecting the lower end of the pipe and the initiator mixing vessel, and charging of the aqueous monomer solution to the three-axis kneader stopped. Thus it was necessary to remove the gel in the pipe and upper portion of the pipe and to exchange the bowl-shaped filter with new one. During the removal and exchange, the polymerization was stopped and it was necessary to start over again.

In accordance with the method of this invention, removal of dissolved oxygen from an aqueous monomer solution is continuously and instantaneously effected with high efficiency by the use of a simple apparatus and a simple procedure. Thus, the aqueous monomer solution can be fed in a homogeneous, stable state to the polymerization vessel before any of the steps involved in the production of the polymer has a chance to induce undesirable polymerization. The polymerization which ensues, therefore, produces a polymer of high quality. When the polymerization is to be carried out in the form of a continuous operation, the method of this invention proves advantageously because the aqueous monomer solution from which the dissolved oxygen is removed continuously can be fed continuously to be polymerization vessel. When a port for introduction of a polymerization initiator is formed in the outlet part of the aspirator or in the diffuser part of the ejector and the polymerization initiator is fed through this port for addition to the aqueous monomer solution, there is attained a particularly advantageous benefit for continuous polymerization that the aqueous monomer solution can be admixed with the polymerization initiator with high thoroughness. Further, since the removal of dissolved oxygen is effected continuously and instantaneously, the aqueous monomer solution with a sufficiently low dissolved oxygen concentration can be obtained even from the outset of the operation. Even when the operation is discontinued because of emergency or for some other reason, there is no possibility of the aqueous monomer solution being forwarded in an instable state to the site of polymerization. Since the method of this invention has absolutely no use for a diffusion device such as the diffusing tube or diffusing panel provided with fine diffusing pores, it cannot entail the problem of clogging. The apparatus used for working this method, therefore, can be cleaned very easily and can be stopped and started with great ease.

What is claimed is:

1. In a method for the production of a polymer from an aqueous solution of a corresponding $\alpha, \beta$-ethylenically unsaturated monomer, the step of effecting substantial removal of dissolved oxygen from said aqueous monomer solution before said aqueous monomer solution reaches the site of polymerization, which comprises forwarding said aqueous monomer solution and an inert gas each in the form of a continuous flow toward the site of polymerization, spouting either of said two fluids through a nozzle parallelly into the flow of the other fluid thereby creating forced contact between said aqueous monomer solution and said inert gas.

2. A method according to claim 1, wherein the speed at which said one fluid spouted into said flow of said other fluid passes the narrowest point of said nozzle is equal to at least a Reynolds number 1,000.

3. A method according to claim 2, wherein the ratio of the amount of said inert gas to that of said aqueous monomer solution is in the range of 0.1 to 10 by volume.

4. A method according to claim 1, wherein an aspirator is used for spouting said one fluid through said nozzle into flow of said other fluid and creating forced contact bewteen said aqueous monomer solution and said inert gas.

5. A method according to claim 1, wherein an ejector is used for spouting said one fluid through said nozzle into flow of said other fluid and creating forced contact between said aqueous monomer solution and said inert gas.

6. A method according to claim 2, wherein said inert gas is at least one gas selected from the group consisting of nitrogen, carbon dioxide, argon, methane, and ethane.

7. A method according to claim 1, wherein said polymer is a cross linked polymer when said polymer is prepared from said aqueous solution of $\alpha, \beta$-ethylenically unsaturated monomer.

* * * * *